United States Patent
Paragot et al.

(10) Patent No.: US 9,043,032 B2
(45) Date of Patent: May 26, 2015

(54) VERIFICATION AND CONTROL DEVICE AND METHOD FOR AT LEAST ONE WATER PURIFICATION SYSTEM

(75) Inventors: Christophe Paragot, Guyancourt (FR); Stephane Lemaire, Guyancourt (FR)

(73) Assignee: EMD Millipore Corporation, Billerica, MA (US)

( * ) Notice: Subject to any disclaimer, the term of this patent is extended or adjusted under 35 U.S.C. 154(b) by 721 days.

(21) Appl. No.: 12/739,484

(22) PCT Filed: Nov. 20, 2008

(86) PCT No.: PCT/IB2008/003700
§ 371 (c)(1),
(2), (4) Date: Apr. 23, 2010

(87) PCT Pub. No.: WO2009/066179
PCT Pub. Date: May 28, 2009

(65) Prior Publication Data
US 2010/0305759 A1    Dec. 2, 2010

(30) Foreign Application Priority Data
Nov. 21, 2007  (FR) ...................................... 0759204

(51) Int. Cl.
*G06F 3/048* (2013.01)
*H04L 29/08* (2006.01)
(Continued)

(52) U.S. Cl.
CPC ......... *H04L 67/025* (2013.01); *C02F 2209/006* (2013.01); *C02F 2209/008* (2013.01);
(Continued)

(58) Field of Classification Search
CPC .............. G06Q 50/22; C02F 2209/006; C02F 2209/008

USPC ......................................................... 700/271
See application file for complete search history.

(56) References Cited

U.S. PATENT DOCUMENTS 6,904,370 B1   6/2005  Levinson et al.
6,934,740 B1   8/2005  Lawande et al.
(Continued)

FOREIGN PATENT DOCUMENTS

EP   1 498 733 A1   1/2005
EP   1 647 873 A1   4/2006
(Continued)

OTHER PUBLICATIONS

International Search Report dated Apr. 9, 2009.
(Continued)

*Primary Examiner* — Shogo Sasaki
(74) *Attorney, Agent, or Firm* — Nields, Lemack & Frame, LLC

(57) ABSTRACT

A verification and control method for at least one water purification system is described, which includes a step of supplying, by a server embedded with the water purification system, an editing interface comprising a zone for selecting items of exploitation information representing physical quantities associated with the water purification system, a step of selecting, via the first remote browser, at least one item of exploitation information to constitute at least one exploitation interface page, a step of sending a request to access the exploitation page, by a second remote browser, to the server, a step of collecting the value of each physical quantity represented by a selected item of information to constitute the page, and a step of supplying, by the server, the page comprising each collected value.

13 Claims, 6 Drawing Sheets

(51) Int. Cl.
*G06Q 50/22* (2012.01)
*H04L 12/58* (2006.01)

(52) U.S. Cl.
CPC ............... *G06Q50/22* (2013.01); *H04L 12/58* (2013.01); *H04L 67/34* (2013.01); *H04L 67/125* (2013.01); *H04L 67/12* (2013.01); *H04L 67/02* (2013.01)

(56) References Cited

U.S. PATENT DOCUMENTS

| | | | |
|---|---|---|---|
| 6,954,701 B2 * | 10/2005 | Wolfe | 702/22 |
| 7,424,399 B2 * | 9/2008 | Kahn et al. | 702/188 |
| 2002/0161866 A1 * | 10/2002 | Tozer et al. | 709/220 |
| 2005/0038916 A1 | 2/2005 | Nguyen | |
| 2005/0080879 A1 | 4/2005 | Kim et al. | |
| 2006/0089929 A1 | 4/2006 | Morikawa | |
| 2007/0219728 A1 * | 9/2007 | Papageorgiou et al. | 702/23 |

FOREIGN PATENT DOCUMENTS

| | | |
|---|---|---|
| FR | 2 839 802 A1 | 11/2003 |
| GB | 2 359 907 A | 9/2001 |
| JP | 2002-132335 A | 5/2002 |
| JP | 2003-223218 A | 8/2003 |
| WO | 02/082302 A1 | 10/2002 |
| WO | 2004/093423 A1 | 10/2004 |

OTHER PUBLICATIONS

Japanese Communication, with English translation, mailed Apr. 2, 2013 in corresponding Japanese patent application No. 2010-534567.

* cited by examiner

VERIFICATION AND CONTROL DEVICE AND METHOD FOR AT LEAST ONE WATER PURIFICATION SYSTEM

FIELD OF INVENTION

The present invention concerns a verification and control device and method for at least one water purification system. It applies, in particular, to the supervision, verification, maintenance and control of a set of water purification systems.

The invention relates more particularly to the configurable interfacing of water purification systems with other computerized systems such as software packages and other software using a hypertext transfer protocol ("http") and exchange files as a basis for communication, as well as with embedded systems, such as clinical analyzers and other systems requiring the integration of water purification systems in a context of OEM type.

BACKGROUND OF THE INVENTION

In all water purification systems, it is currently provided to use only a serial link in accordance with the "RS232" standard to fulfill the following functions:
  printing of the data of the water purification system to a printer that accepts the ASCII/RS232 protocol;
  downloading the data of the water purification system to a computer, by virtue of a specific software application and
  downloading the data, settings and commands from a computer to the water purification system, by virtue of a specific software application.

This technical solution has numerous drawbacks. Firstly, the maximum distance between the water purification system and the apparatus to which it is linked, printer or computer, is limited to approximately ten meters. Furthermore, the data throughput is limited to approximately 10 Kbytes/second. In addition, a specific software application has to be developed and implemented for each type of operating system (for example, Microsoft Windows, Linux, MacOs—registered trademarks) and for each language. Furthermore, a limited number of types of printer may be used, that is to say those printers which accept the ASCII/RS232 protocol. However, this type of printer is becoming obsolete.

The present invention aims to mitigate these drawbacks.

SUMMARY OF THE INVENTION

To that end, a first aspect of the present invention concerns a verification and control method for at least one water purification system, characterized in that it comprises:
  a step of supplying, by a server embedded with said water purification system, an editing interface to display by a first remote browser, said interface comprising a zone for selecting items of exploitation information representing physical quantities associated with the water purification system,
  a step of selecting, via said first remote browser, at least one said item of exploitation information to constitute at least one exploitation interface page for said water purification system, comprising each said item of information,
  a step of selecting said water purification system, by a second remote browser,
  a step of sending a request to access a said exploitation page, by said second remote browser, to said server,
  a step of collecting the value of each physical quantity represented by a selected item of information to constitute the page concerned by said request, by said server and
  a step of supplying, by said server, said page comprising each said collected value.

The implementation of the present invention thus makes it possible, on water purification systems, to adapt the content of the exchanges as well as the format in which the content is to be presented, without any update or modification of the system. The invention uses a user-friendly and intuitive interface dedicated to the configuration of these various exchanges so that users may configure the possible exchanges according to their need.

Thus, by implementing web technologies, users have access to the water purification systems from any geographical location (that is to say that there is no longer any limit to the distance between the user and his system). Furthermore, the user no longer needs to install a specific software application on his computer to communicate with the water purification system. This is because this communication is enabled by a standard web browser, for example on a personal computer, personal digital assistant or mobile telephone. In addition, the printing of the data from the water purification systems is carried out from the standard web browser, thus any type of printer on the market may be used. Moreover, the media used by web technologies have a markedly higher data rate than that of the RS232 serial link. This makes it possible to download and/or to supervise a much greater volume of data. The implementation of the present invention offers new services, in particular intended to be used in pharmaceutical, research, analysis, Quality Assurance "QA" and/or Quality Control "QC" laboratories. It also makes it possible to assist users to work in accordance with good laboratory practices.

Among the other advantages of the present invention there are:
  the use of the user interface of the water purification systems in order to convey communication messages (advertising, event, on-line documentation, etc.) remotely and automatically.
  it facilitates the interfacing of the water purification system with laboratory information management systems (called "LIMS"),
  it assists in putting the water purification system into conformity with the regulations of the FDA (acronym for "Food and Drug Administration") and, in particular, with section 21 CFR part 11 of those regulations.
  it facilitates the transformation and the integration of the water purification system in the context of constructing original systems, in the context of the "OEM" market (acronym for "original equipment manufacturer").
  According to particular features:
  during the step of supplying an editing interface, said interface comprises a zone for selecting items of exploitation information representing values of settings for operating said water purification system,
  during the step of selecting via the first remote browser, at least one said item of exploitation information representing a setting value is selected to constitute an exploitation interface page for said water purification system.
  and the method of the present invention, as succinctly set forth above comprises:
  a step of supplying, via said second browser, at least one setting value in a said exploitation interface page,
  a step of transmitting each said setting value supplied to the web server and a step of controlling the water purification system, via said web server, on the basis of each said setting value.

By virtue of these provisions, it is also possible to configure a control interface for the water purification system.

According to particular features:

during the step of selecting, via said first remote browser, at least one said item of exploitation information to constitute an exploitation interface page for said water purification system, comprising each said item of information, an identifier of each said item of exploitation information is inserted in a description of said page and during the step of supplying by said server said page comprising each said collected value, when the server goes through said description of the page and arrives at a selected identifier of an item of information, it replaces said identifier by a value of the physical quantity represented, in the page supplied to the second remote browser.

The implementation of the present invention is thus easy and the display of the physical quantity values is fast.

According to particular features, during the step of supplying an editing interface, the zone for selecting items of exploitation information representing physical quantities associated with the water purification system comprises at least one instantaneous value of the water quality in the water purification system.

For example, that web page shows the main water quality parameters in real time. These values may be printed or saved in a file in order for them to be analyzed with a spreadsheet.

According to particular features, during the step of supplying an editing interface, the zone for selecting items of exploitation information representing physical quantities associated with the water purification system comprises:

at least one item of information representing an operation of preventive maintenance, at least one item of information representing a quantity of consumable remaining in said water purification system, at least one item of information representing qualification and validation of the water purification system, at least one item of operation diagnostic representing information of the water purification system, at least one item of information representing updating of a software application for operation of the water purification system, at least one item of information representing emails associated with events occurring on the water purification system and/or at least one item of information representing amount of past use of the water purification system.

The present invention thus enables the management of multiple applications associated with the water purification system: all the data linked to the purification process may thus be displayed in real time.

Similarly, an automatic command may be carried out and the local user of the water purification system can receive a new consumable before the one in course of use has been used up.

Moreover, it is thus possible to assist the diagnostic since it is possible to interact with the water purification systems in real time, for example to remotely launch a testing routine.

According to particular features, during the step of supplying, by said server, said page comprising each said collected value, said page represents a schematized flow in the water purification system.

The supervision of the water purification system is thus more intuitive and easier.

According to particular features, during the step of collecting the value of each physical quantity represented by an item of information selected to constitute the page concerned by said request, by said server, at least one SSI command is implemented (SSI being an acronym for "Server Side Include"). By virtue of these provisions, pages are easily constituted comprising values updated at the time of constitution of the page.

According to a second aspect, the present invention concerns a verification and control device for at least one water purification system, characterized in that it comprises:

a means for supplying, by a server embedded with said water purification system, an editing interface to display by a first remote browser, said interface comprising a zone for selecting items of exploitation information representing physical quantities associated with the water purification system, a means for receiving a selection made via said first remote browser, of at least one said item of exploitation information and for constituting at least one exploitation interface page for said water purification system, comprising each said item of information, a means for receiving a request to access a said exploitation page, from a second remote browser, a means for collecting the value of each physical quantity represented by a selected item of information to constitute the page concerned by said request, and a means for supplying said page comprising each said collected value.

As the particular advantages, objects and features of this device are similar to those of the method of the present invention, as succinctly set forth above, they are not reviewed here.

BRIEF DESCRIPTION OF THE DRAWINGS

Other advantages, objects and features of the present invention will emerge from the following description, given, with an explanatory purpose that is in no way limiting, with reference to the accompanying drawings, in which.

DETAILED DESCRIPTION OF THE INVENTION

In the whole of the description, an element which is close to a water purification system is termed "local" and an element which is not necessarily close to that water purification system is termed "remote".

Figure 1:
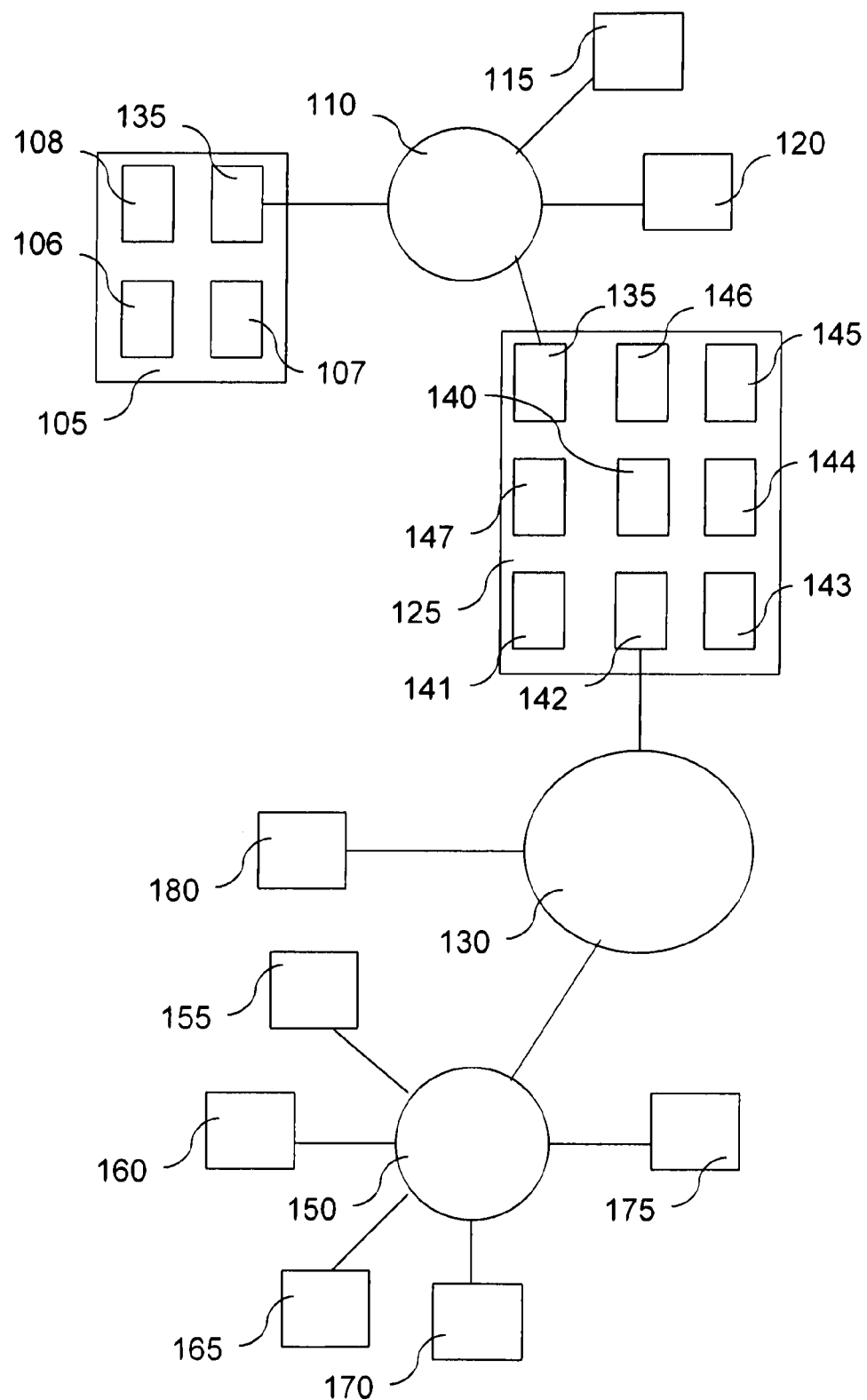
FIG. 1 is a diagram of a particular embodiment of a device of the present invention.

A water purification system 105 can be seen in FIG. 1, which is associated, via a local network 110, with a printer 115, a terminal 120 and a network server 125. A wide area computer network 130, for example the Internet network, connects these elements to a remote network server 155 itself connected, via a local network 150, to a database server 160, an email server 165, a web server 170 and to a terminal 175. The wide area computer network 130 is also accessible by a terminal 180 not on the network. The terminals 175 and 180 implement a standard browser and are, for example, constituted by personal computers, personal digital assistants or mobile telephones.

It is to be noted that, although in FIG. 1, in the interest of clarity, only one exploitation site for a water purifier 105 has been represented, the present invention is adapted to interact with numerous sites implementing water purification systems 105.

Similarly, in FIG. 1, only one water purification system 105 has been represented associated with the local network server 125. However, the present invention is not limited to the verification and the control of a water purification system 105 by network server 125.

As a variant, the network server 125 is embedded in the water purification system 105.

The water purification system 105 comprises:
- sensors 106 of physical quantities that represent the operation of the water purification system 105, in particular the quality and the quantity of the purified water,
- a microprocessor 107 executing instructions of at least one item of software for operation of the water purification system 105 which, in particular, detects events occurring in the water purification system 105,
- a memory 108 storing the latest update of that software and
- at least one item of software for updating that item of software for operation of the water purification system 105.

The network server 125 and the water purification system 105 communicate via a communication interface 135. This communication interface 135, of known type, is adapted not only to convey data representing the operation of the water purification system 105 from said system 105 to said server 125, but also to convey data for modifying the operation of the water purification system 105, from the server 125 to said system 105.

The local network 125 furthermore hosts:
- an application 141 for automatic management and planning of the preventive maintenance operations to carry out on the water purification system 105,
- an application 142 for automatic management of the consumables of the water purification system 105,
- an application 143 for automatic management and planning of the qualifications and validations of the water purification systems 105,
- an operation diagnostic application 144 for said water purification system 105,
- an application 145 for updating a software application for operation of the water purification system 105,
- an application 146 for automatic sending of emails that is adapted to remotely send emails representing events occurring on the water purification system 105 and
- an application 147 for remote automatic monitoring of the use of the water purification system 105.

The local network server 125 hosts a web server application 140, of known type, adapted to remotely supply, to a standard web browser, for example operating on the terminals 175 and 180, via the wide area network 130, at least one page representing data received by said server for said water purification system and at least one page for supplying, by a remote terminal, data to transmit to said water purification system The web server application 140 is furthermore adapted to supply at least one page representing an instantaneous value of the water quality in the water purification system 105 and at least one page representing operating parameters of the water purification system 105.

The web server application 140 is also adapted to supply at least one page representing a schematized flow in the water purification system 105. As regards supervision, it uses this representation in the form of a schematic flow of the water purification system, of the state and of the data coming from its sensors 106 and/or of the configuration parameter values. All the data linked to the purification process are displayed in real time. It is very easy, by virtue of this viewing, to diagnose a hardware problem. Furthermore, it is possible to change the operating mode of the system via this interface, which interface is described elsewhere.

The web server application 140 is also adapted to supply at least one page representing calibration of sensors 140 of the water purification system 105.

The web server application 140 is also adapted to supply data linked to the different other computer applications, in particular:
- at least one page representing said maintenance operations supplied by the application for automatic management and planning of the preventive maintenance operations,
- at least one page representing a consumable need supplied by the application for automatic management of the consumables.
- at least one page representing qualifications and validations supplied by the application for automatic management and planning of the qualifications and validations of the water purification systems,
- at least one page representing at least one diagnostic supplied by the diagnostic application and
- at least one page for supplying, by a remote terminal, an updated item of software for operation of the water purification system, which is implemented by the updating software.

Figure 2:
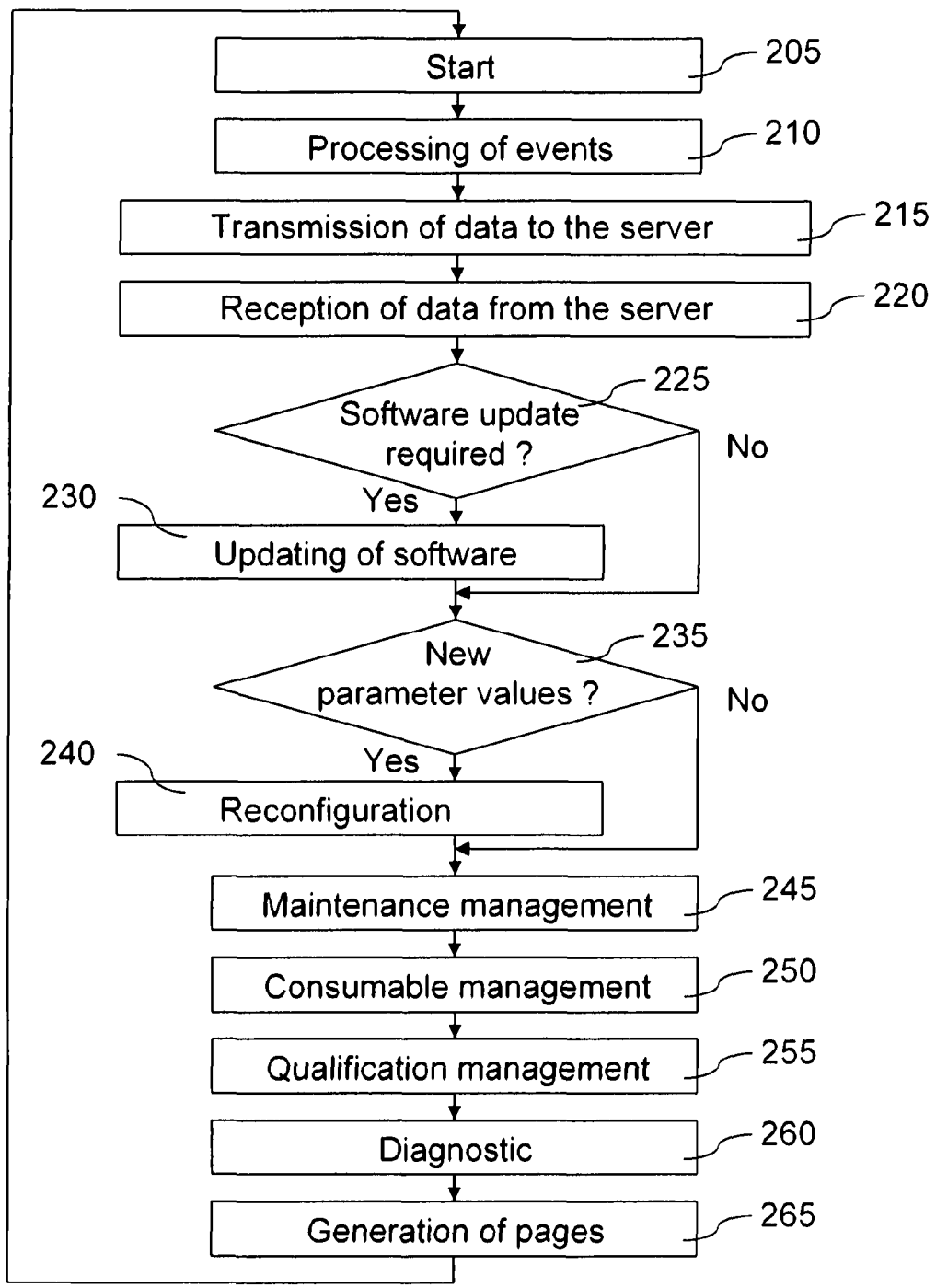
FIG. 2 is a representation in the form of a logigram of the steps implemented by the device illustrated in FIG. 1.

As can be seen in FIG. 2, once installed, the device illustrated in FIG. 1 implements a step 205 of operating the water purification system 105, including acquisition of values supplied by the sensors 106. Next, during a step 210, the purification system 105 carries out an event processing operation to detect the occurrence of an event in said system 105.

The data collected and the events are, during a step 215, put into memory of the water purification system 105 and transmitted to the local network server 125 which also places them in memory. It is to be recalled here that, as a variant, the network server 125 is embedded in the water purification system 105.

If an event has been detected, the server 125 carries out the operations of automatic sending of emails to remotely transmit emails representing events occurring on the water purification system 105.

During a step 220, data are received from the local server 125, to modify the operation of the system 105, for example new configuration parameter values or elements for the updating of the software 106 for operation of the system 105.

It is noted that, among the messages conveyed to the water purification system, the server 125 may also remotely and automatically transmit communication messages (advertising, event, on-line documentation, etc.) which are then presented to a user by the user interface of the water purification system 105.

During a step 225, it is determined whether an update of the software for operating the water purification system 105 was required by the server 125. If yes, during a step 230, the updating software carries out the update, in memory 108 of the system 105, of the operating software, by implementing an update supplied by the local terminal 120 or, via the server 125, by a remote computer system and then the system 105 is started again.

If the result of step 225 is negative or further to step 230, it is determined during a step 235 whether new configuration parameter values have been received. If yes, during a step 240, the values of those parameters are modified in memory of the system 105.

Further to step 240 or if the result of step 235 is negative, operations are carried out, during a step 245, of automatic planning and management of the preventive maintenance operations to perform on the water purification system 105 and the results of these operations are transmitted to the server 125.

Next, during a step 250, operations of automatic management of the consumables of the water purification system 105 are carried out and the results of these operations are transmitted to the server 125.

During a step 255, operations of automatic management and planning of the qualifications and validations of the water purification systems 105 are carried out and the results of these operations are transmitted to the server 125.

During a step 260, diagnostic operations are carried out of operation of said water purification system 105 and the results of these operations are transmitted to the server 125.

During a step 265, at the request of a standard web browser operating on one of the terminals considered, or statically, the server generates pages detailed with reference to FIG. 1. As the server stores all the data it receives, it is possible for a remote user to consult them or save them in an XML file in order to analyze them or exploit them through software applications such as Microsoft Excel or Access (registered trademarks).

Next, step 205 is returned to.

As can be understood on reading the above, the implementation of the device illustrated in FIGS. 1 and 2 makes it possible, whatever the geographical location of the user, to access water purification systems via a web interface embedded in that system or associated with it, from any apparatus (computer, mobile phone, PDA) without installation of a specific software application.

This device is for example intended to be used in pharmaceutical, research, analysis Quality Assurance "QA" and/or Quality Control "QC" laboratories. It also makes it possible to assist users to work in accordance with good laboratory practices.

The printing of the data from the water purification systems is carried out from the standard web browser, thus any type of printer on the market may be used.

The media used (wifi, Ethernet) by the web technologies have a data rate (up to 1 Gigabit/sec) that is markedly higher than that of the RS232 serial link. This makes it possible to download and/or to supervise a much greater volume of data.

As a variant, the functions 141 to 147 set forth above are not localized or hosted by the local server 125 but are hosted by the remote server 155 or by the database server 160.

Figure 3:
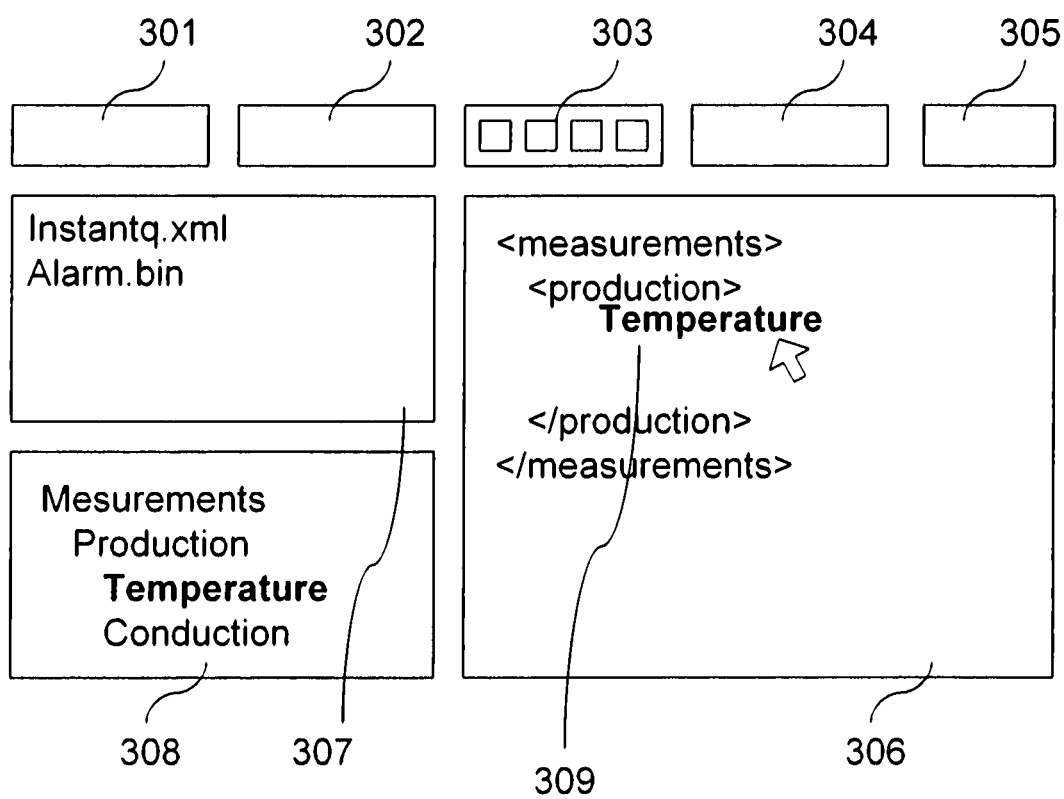
FIG. 3 is a diagram of a user interface for remotely editing the pages supplied by a web server incorporated into the device illustrated in FIG. 1.
Figure 4:
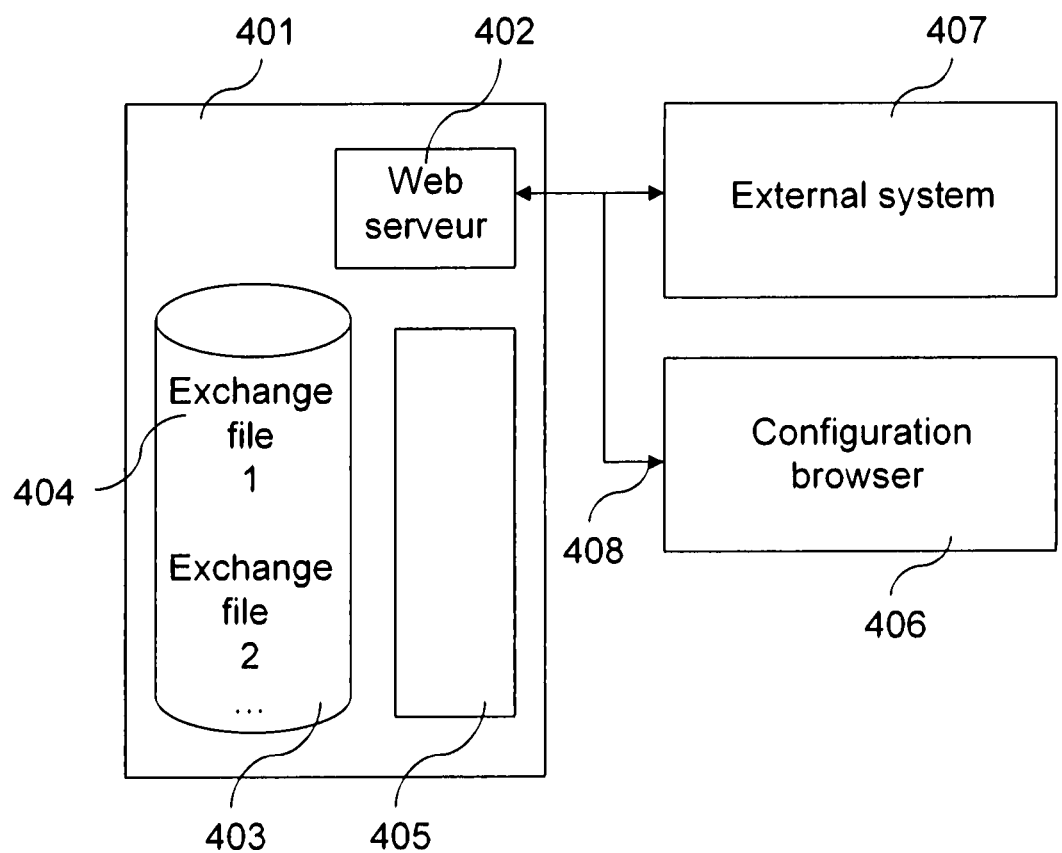
FIG. 4 is a diagram of exchanges of messages in the device illustrated in FIG. 1.
Figure 5:
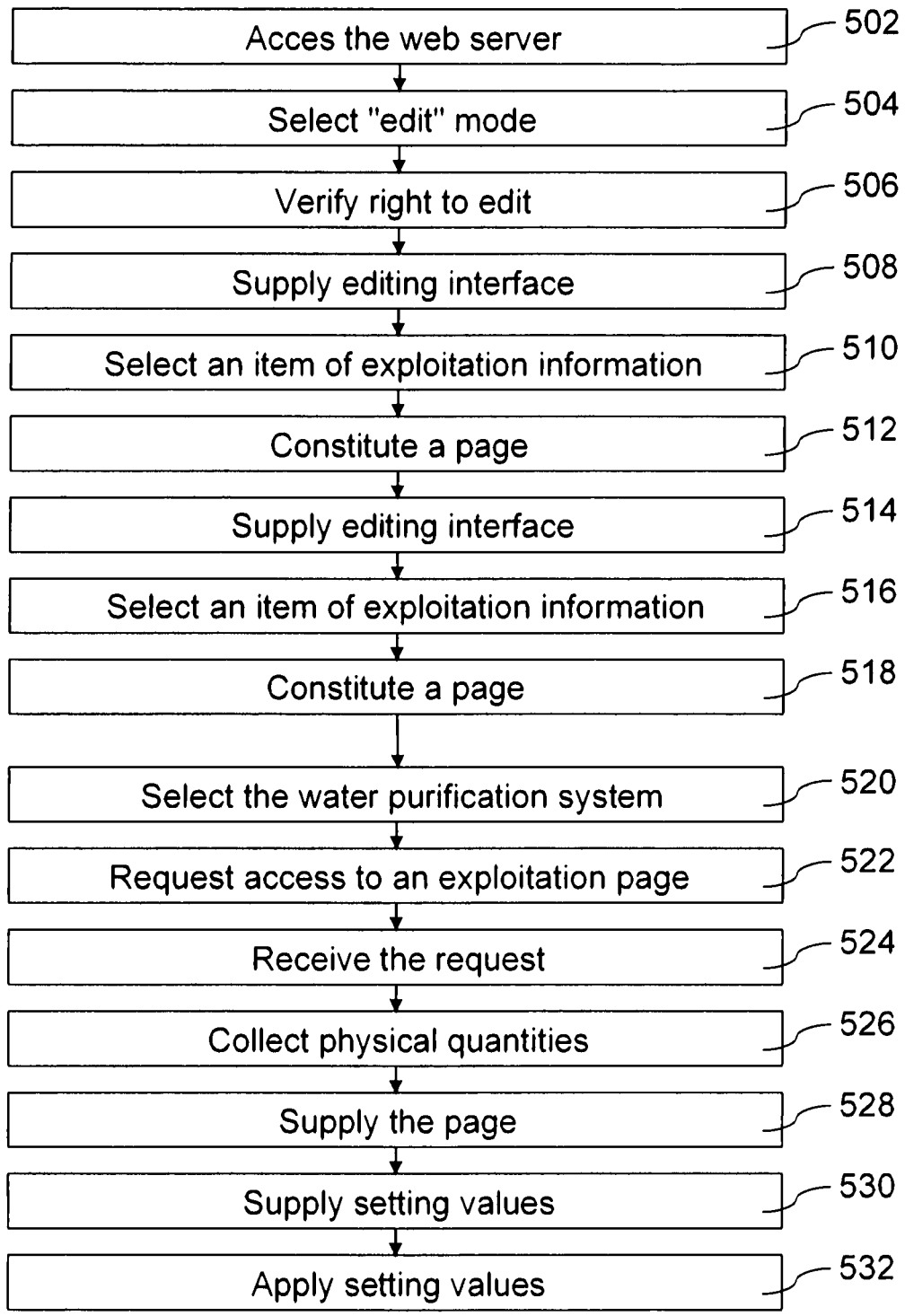
FIG. 5 represents, in logigram form, steps implemented in a particular embodiment of the method of the present invention and FIG. 6 diagrammatically represents an exploitation interface displayed by a remote browser of the water purification system.

FIGS. 3 to 5 concern the configurable interfacing of water purification systems with other computerized systems such as software packages (LIMS, acronym for "Laboratory Information Management System", SCADA, acronym for "Supervisory Control and Data Acquisition", etc.) and other software applications using http (acronym for hypertext transfer protocol) and exchange files as a basis for communication, as well as with embedded systems, such as clinical analyzers and other systems requiring the integration of water purification systems in an OEM type context (OEM being an acronym for original equipment manufacturer).

The object of this interfacing is to make it possible, on water purification systems, to adapt the content of the exchanges as well as the format in which the content is to be presented, without any update or modification of the system. This interfacing is itself based on a user-friendly and intuitive interface illustrated in FIG. 3, dedicated to the configuration of these various exchanges so that users may configure the possible exchanges according to their need.

The available contents, illustrated in the list 308, are of different kinds:
physical measurements coming from sensors of the system (temperature, pressure, resistivity, conductivity, total organic carbon "TOC", water level, and other measurements necessary for the water purification process),
measurements concerning electrical devices which compose the water purification systems (voltage, current, UV radiation and other measurements linked to the supervision of the electrical devices which compose the water purification systems).
any other information attached to the software embedded in the systems such as calibration data, configuration data, or alarm, alert, error, history, and audit-trail information (that is to say recording of the use of the system resources on a computer), information on consumables and the states of the process, consumables and hardware.

It is also possible to control the system with this same method by selecting (by drag-and-drop), from a list of available commands (not represented), state control fields or setting value input fields.

The user interface represented in FIG. 3, serving to configure the various exchanges, is simply a web page accessible from any web browser connected to the web server embedded with a water purification system.

By virtue of this interface 300, the user may drag-and-drop data and/or commands of the water purification system available from the list 308 to the text zone 306 which represents the content of one of the exchange files listed at 307. In FIG. 3, by virtue of a pointing device, such as a mouse, the user moves the term "temperature" from zone 308 to zone 306 to insert it into the content 309 of the file identified in zone 304. Once the item of data has been deposited in zone 306, an identifier is inserted instead at location 309 in the content of the exchange file which identifier the web server will replace by the real value of that item of data. The user may delete an exchange file by pressing on the "delete" button 301 after having selected the exchange file from the list 307. The user organizes the presentation of the data of an exchange file on the basis of zone 306. In the same way as for a conventional text editor, some functions such as "cut and paste" for the text are available from zone 303. The user may then select the type of MIME which is the most adapted for his exchange file by virtue of field 305 and lastly defines the URL (acronym for "Uniform Resource Locator") to access the exchange file by entering it in the text zone 304.

The exchange file may be in a proprietary format such as a binary, text, CSV file, etc. (CSV being an acronym for "comma separated value") or be based on a standard format such as XML (acronym for extensible markup language), HTML (acronym for hypertext markup language), JSON (acronym for "JavaScript Object Notation") and others. The list 308 provides all the data of the water purification system as well as its commands, in different formats (text, utf8, binary, etc.). As regards the values, these may be represented in different formats: hexadecimal, octal, binary and decimal As illustrated in FIG. 4, once the exchange file 404 has been terminated, it becomes exploitable by one or more external systems 407. The external system 407 uses http 408 to obtain one or more exchange files 404 via the web server 402. When the server 402 sends an exchange file 404, this is analyzed by the SSI ("server side include") of the web server 402 in order to identify the various identifiers placed in that exchange file 404.

It is to be recalled here that SSI is generally dedicated to the management of the server. SSIs facilitate the maintenance of web sites by enabling the parts of the web page that are identical in all the pages of the site to be kept in a single file. These are often the page header and footer, which contain information such as the name of the site, the contact details of its author, etc.

In an original way, in some embodiments of the present invention, this SSI is used to manage the files implemented (see FIG. 4). The SSI commands are executed by the server before the page is sent to the visitor. Using SSI, dynamic information is directly incorporated in exchange files. CGI programs may thus be launched and their output be incorporated into an HTML file, or the current content of different CGI environment variables may be directly displayed in HTML—without passing via a separate CGI script.

In order for a web server to recognize that an HTML file contains SSI instructions, that file is preferentially marked with a special file extension, extension ".shtml", ".shtm", or ".sht".

The SSIs (Server Side Includes) are a set of commands enabling a small script language to be constituted that is executed by the HTTP server. They make it possible, in particular, to include files dynamically in a Web page loaded by a client and to set conditions on the loading of a page. Thus the server constructs the HTML pages on the fly which are sent to the client. From the client's point of view, the page appears in pure HTML (that is to say, without any trace of the SSIs).

When the web server 402 finds an identifier, it replaces it by the real value of the item of data identified, it being possible for that item of data to be of various kinds (see above, the available contents, in particular of physical measurements coming from system sensors, measurements concerning the electrical devices which compose the water purification systems and the other information attached to the software embedded in the systems).

The web server 402 forms an integral part of the water purification system; in the schema below, in the interest of understanding, the web server has been separated from the elements 405 which compose the water purification system (electrical devices, sensors, electronic cards, software applications, etc.).

The user may configure his exchange files from any web browser 406.

The execution of the commands, for example the operating mode of the system, functions in the same way, further to a request by an external system, the web server sends and simultaneously analyzes the exchange file. When it gets to the identifier of the command, the command is executed and the identifier is then replaced by the result. For example, in the case of a change in mode, if the command has in fact been executed the identifier is replaced by "true", otherwise the identifier will be replaced by "false", and the external system thus knows whether the command has in fact been carried out.

It can be seen, with reference to FIG. 5, that, in a particular embodiment, the method of the present invention comprises, first of all, a step 502 of accessing the web server, by a first remote browser, according to known techniques.

Next, during a step 504, via the first remote browser, the user selects the editing of the exploitation interfaces.

During a step 506, the server requests from the first browser, receives from it and verifies a user name and a password, in accordance with known techniques.

During a step 508, the server supplies an editing interface to display by the first remote browser. Said editing interface comprises a zone for selecting exploitation information representing physical quantities that are associated with the water purification system.

This zone for selecting exploitation information representing physical quantities that are associated with the water purification system comprises:

at least one instantaneous value of the quantity of water in the water purification system, at least one item of information representing an operation of preventive maintenance, at least one item of information representing a quantity of consumable remaining in said water purification system, at least one item of information representing qualification and validation of the water purification system, at least one item of operation diagnostic representing information of the water purification system, at least one item of information representing updating of a software application for operation of the water purification system, at least one item of information representing emails associated with events occurring on the water purification system and/or at least one item of information representing amount of past use of the water purification system.

During a step 510, the user selects at least one said item of exploitation information, via the first remote browser. With reference to FIG. 3, this involves dragging a representation of this item of exploitation information from the list 308 to the zone 306.

During a step 512, the server constitutes at least one exploitation interface page for said water purification system, comprising each item of information selected during a step 510.

During a step 514, on selection of a control interface by the first browser, the server supplies an editing interface to display by the first remote browser. Said editing interface comprises a zone for selecting exploitation information representing setting values intended for the water purification system.

During a step 516, the user selects at least one said setting value, via the first remote browser.

During a step 518, the server constitutes at least one exploitation interface page for said water purification system, comprising each item of information selected during a step 516.

During the steps 512 and 518, the server inserts an identifier for each said item of exploitation information into a description of the page in course of being edited.

It is noted that a page so constituted may both comprise exploitation information selected during step 510 and fields for entry of setting values selected during step 516.

During a step 520, via a second remote browser, which may possibly be identical to the first remote browser, a user or a computer application selects the water purification system.

During a step 522, the second remote browser sends a request to access an exploitation page, to the embedded server.

During a step 524, the server receives that request.

During a step 526, the server collects the value of each physical quantity represented by an item of information selected to constitute the page concerned by said request, each state to display and any information represented in the page. During this step 526, the server goes through a description of the page requested and, each time it comes to a selected information identifier, it replaces that identifier by a physical quantity value represented in the page to supply to the remote second browser.

During a step 528, the embedded server supplies said page comprising each said collected value. Preferentially, this supply is carried out via the exchange file 404 (see FIG. 4). Preferentially, during step 528 the supplied page represents a schematized flow in the water purification system.

During a step 530, the second browser supplies the server with the setting values in the fields generated during step 518.

During a step 532, the server controls the water purification system, via a computer application of the water purification system, on the basis of each said setting value.

Figure 6:
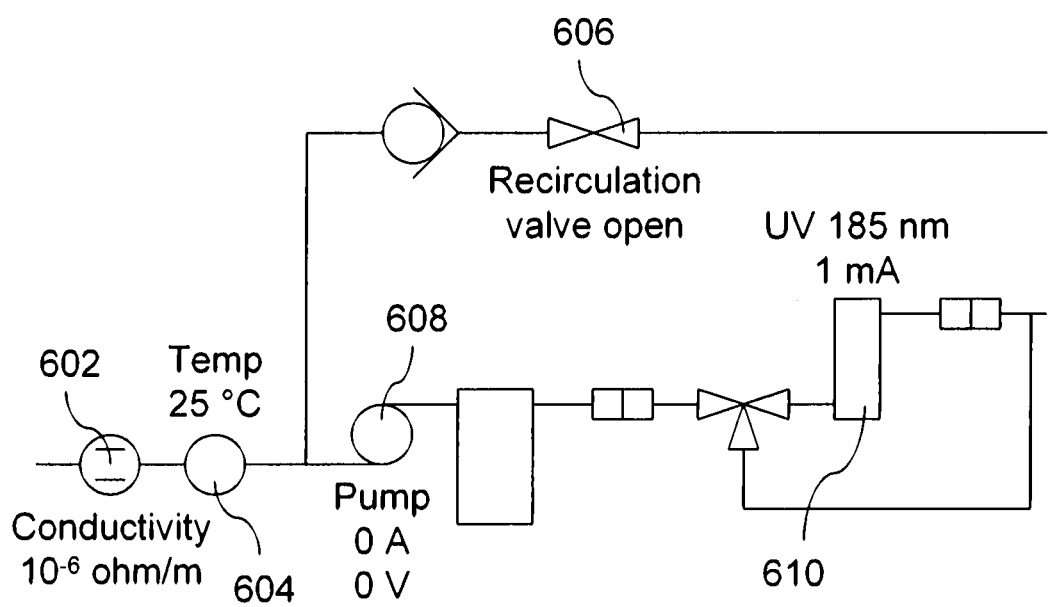

In FIG. 6, an exploitation interface displayed by a browser can be seen. In this interface, systems and sensors are represented that are displayed on a water flow circuit of the water purification system.

A conductivity meter 602 is represented with, beneath it, the value of the conductivity measured. Similarly, a thermometer 604 is represented with, beneath it, the value of the measured temperature. The state of a recirculation valve 606 is written beneath a representation of that valve. For a pump 608, the current and the voltage which are applied to it are written below its representation. Lastly, for an ultraviolet purification system 610, the wavelength used and the current which passes through it are indicated above the graphical representation.

By selecting one of the components or systems, for example by a double-click, the user may, for example, control its state, see the history of the measurements and of the maintenance operations, make a value setting or read the quantity of water treated or the quantity of available consumable.

As can be understood from reading the foregoing description, the supervision of the water purification system illustrated in FIG. 6 is easy, may be configured remotely by a terminal possessing a standard web browser and be performed remotely.

The invention claimed is:

1. A verification and control method for at least one water purification system comprising:
  a step of supplying, by a server embedded with said water purification system, an editing interface to display by a first remote browser;
  a step of selecting, via said first remote browser, an exploitation interface page from a first zone within said editing interface, wherein said first zone represents a first portion of said editing interface;
  a step of selecting, via said first remote browser, at least one item of exploitation information representing physical quantities associated with the water purification system from a second zone within said editing interface, wherein said second zone represents a second portion of said editing interface and comprises a list of different items of exploitation information that can be selected by a user;
  a step of placing, via said first remote browser, said selected at least one item of exploitation information from said second zone into a third zone within said editing interface, wherein said third zone represents a third portion of said editing interface and comprises a list of selected items of exploitation information that constitutes said selected at least one exploitation interface page for said water purification system;
  a step of selecting said water purification system, by a second remote browser;
  a step of sending a request to access said exploitation interface page, by said second remote browser, to said server;
  a step of collecting, by said server, the value of each physical quantity represented by each item of said list of selected items of exploitation information to constitute the exploitation interface page concerned by said request, by said server and
  a step of supplying, by said server, said exploitation interface page comprising each said collected value to said second remote browser;
  wherein said list of different items of exploitation information further comprise settings for operating said water purification system;
  wherein selecting, via said first remote browser, at least one item of exploitation information comprises selecting a setting for operating said water purification system from said settings;
  the method further comprising:
  a step of supplying, via said second remote browser, a value for said selected setting in said exploitation interface page,
  a step of transmitting, by said second remote browser, said value for said selected setting to the server; and
  a step of controlling the water purification system, via said server, on the basis of said value for said selected setting.

2. The method according to any one of claim 1 characterized in that:
  during the step of placing, via said first remote browser, said selected at least one item of exploitation information from said second zone into a third zone within said editing interface, an identifier of said selected at least one item of exploitation information is inserted in a description of said exploitation interface page; and
  during the step of supplying, by said server, said exploitation interface page comprising each said collected value, when the server goes through said description of the exploitation interface page and arrives at an identifier of an item of information, it replaces said identifier by a value of the physical quantity represented, in the exploitation interface page supplied to the second remote browser.

3. The method according to any one of claim 1, wherein said list of different items of exploitation information comprises at least one instantaneous value of the water quality in the water purification system.

4. The method according to any one of claim 1, wherein said list of different items of exploitation information comprises at least one item selected from the group consisting of:
  information representing an operation of preventive maintenance,
  information representing a quantity of consumable remaining in said water purification system,
  information representing qualification and validation of the water purification system,
  operation diagnostic representing information of the water purification system,
  information representing updating of a software application for operation of the water purification system,
  information representing emails associated with events occurring on the water purification system and
  information representing amount of past use of the water purification system.

5. The method according to any one of claim 1, characterized in that,
  during the step of supplying, by said server, said exploitation interface page comprising each said collected value, said exploitation interface page represents a schematized flow in the water purification system.

6. The method according to any one of claim 1, characterized in that, during the step of collecting the value of each physical quantity represented by an item of information selected to constitute the exploitation interface page concerned by said request, by said server, at least one SSI command is implemented (SSI being an acronym for "Server Side Include").

7. A verification and control device for at least one water purification system comprising:
a means for supplying, by a server embedded with said water purification system, an editing interface to display by a first remote browser;
a means for selecting, via said first remote browser, an exploitation interface page from a first zone within said editing interface, wherein said first zone represents a first portion of said editing interface;
a means for selecting, via said first remote browser, at least one item of exploitation information representing physical quantities associated with the water purification system from a second zone within said editing interface, wherein said second zone represents a second portion of said editing interface and comprises a list of different items of exploitation information that can be selected by a user,
a means for receiving a selection made via said first remote browser, of at least one said item of exploitation information from said second zone, and for placing said selected at least one item of exploitation information from said second zone into a third zone within said editing interface, wherein said third zone represents a third portion of said editing interface and comprises a list of selected items of exploitation information that constitutes said selected at least one exploitation interface page for said water purification system;
a means for receiving a request to access said exploitation interface page, from a second remote browser,
a means for collecting, by said server, the value of each physical quantity represented by each item of said list of selected items of exploitation information to constitute the exploitation interface page concerned by said request, and
a means for supplying said exploitation interface page comprising each said collected value to said second remote browser;
wherein said list of different items of exploitation information further comprise settings for operating said water purification system;
wherein selecting, via said first remote browser, at least one item of exploitation information comprises selecting a setting for operating said water purification system from said settings;
the system further comprising:
a means for supplying, via said second remote browser, a value for said selected setting in said exploitation interface page,
a means for transmitting, by said second remote browser, said value for said selected setting to the server; and
a means for controlling the water purification system, via said server, on the basis of said value for said selected setting.

8. The method of claim 6, wherein said exploitation interface page representing said schematized flow displays information selected from the group consisting of conductivity, temperature, a state of a recirculation valve, a current and voltage of a pump, and a wavelength and current used for an ultraviolet purification system.

9. The method of claim 1, wherein supplying an exploitation interface page to a remote browser comprises e-mailing an alert to the remote browser.

10. The method of claim 1, wherein receiving a request to create an exploitation interface page comprises receiving a request to create an exploitation interface page from a local terminal in communication with said server.

11. The method of claim 1, wherein said editing interface further comprises a delete button for deleting said exploitation interface page.

12. The method of claim 1, wherein the format of said exploitation interface page is selected from the group consisting of binary, text, CSV, XML, HTML, and JSON.

13. The method of claim 1, wherein the remote browser is selected from the group consisting of a web browser, Laboratory Information Management System (LIMS), and Supervisory Control and Data Acquisition (SCADA).

* * * * *

UNITED STATES PATENT AND TRADEMARK OFFICE
CERTIFICATE OF CORRECTION

PATENT NO. : 9,043,032 B2
APPLICATION NO. : 12/739484
DATED : May 26, 2015
INVENTOR(S) : Christophe Paragot et al.

It is certified that error appears in the above-identified patent and that said Letters Patent is hereby corrected as shown below:

Claims

In column 12, line 27, in claim 2 delete "to any one of claim" and insert -- to claim --, therefor.

In column 12, line 43, in claim 3 delete "to any one of claim" and insert -- to claim --, therefor.

In column 12, line 47, in claim 4 delete "to any one of claim" and insert -- to claim --, therefor.

In column 12, line 64, in claim 5 delete "to any one of claim" and insert -- to claim --, therefor.

In column 13, line 3, in claim 6 delete "to any one of claim" and insert -- to claim --, therefor.

In column 14, line 20, in claim 8 delete "claim 6" and insert -- claim 5 --, therefor.

Signed and Sealed this
Sixth Day of October, 2015

Michelle K. Lee
*Director of the United States Patent and Trademark Office*